May 9, 1933. D. F. NEWMAN 1,907,558
PROJECTION SYSTEM
Filed Jan. 25, 1930
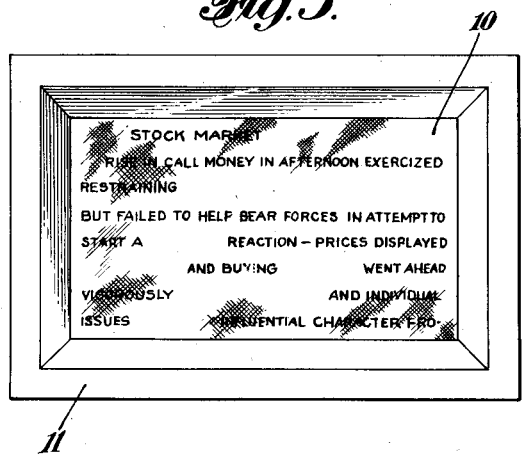
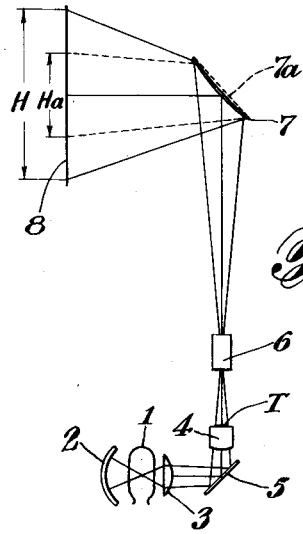
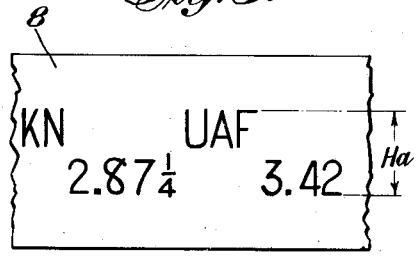
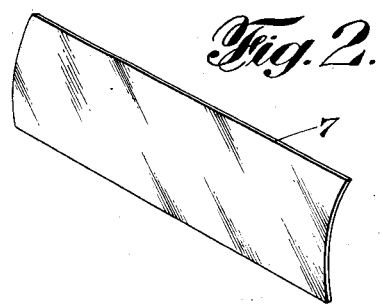
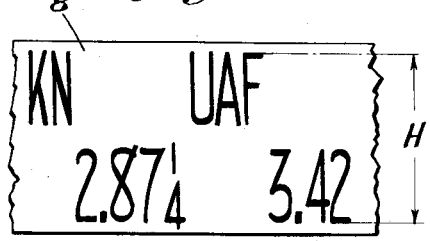
INVENTOR
David F. Newman
BY
Ward, Crosby & Neal
ATTORNEYS Patented May 9, 1933

1,907,558

UNITED STATES PATENT OFFICE

DAVID F. NEWMAN, OF FREEPORT, NEW YORK, ASSIGNOR TO TRANS-LUX DAYLIGHT PICTURE SCREEN CORPORATION, OF NEW YORK, N. Y., A CORPORATION OF DELAWARE

PROJECTION SYSTEM

Application filed January 25, 1930. Serial No. 423,289.

My invention relates to a projection system wherein images of representations, characters, indicia or the like are obtained upon a suitable screen, or equivalent.

My invention relates to a projection system of simple character and which serves, particularly, to cause the production on the screen of images which may be readily, easily, and accurately observed.

Various other objects, advantages and characteristics of my invention will become apparent from the following description taken in connection with the accompanying drawing.

My invention resides in the system, arrangement and features of construction of the character hereinafter described and claimed.

For an understanding of my invention and for an illustration of one of the many forms thereof, reference is to be had to the accompanying drawing, in which:

Figure 1 is a diagrammatic view of a projection system constructed in accordance with my invention;

Fig. 2 is a perspective view of a light-reflecting mirror;

Figs. 3 and 4, respectively, are front views of the screen of Fig. 1, the former showing the character of prior art projected images and the latter showing images projected by my novel system; and Fig. 5 is a front view of another screen.

In prior art systems for projecting images of "ticker" tape characters, news items or the like, it is well understood that the focal length of the objective lens together with the length of the path traversed by the light beam are controlling factors as regards the size of the images obtained on the screen. When such factors are changed to increase the size of such images, the increase is not confined to one dimension, as the image height, since the width and all other image dimensions are increased proportionately the same.

In accordance with my invention, a novel projection system is provided whereby the images shown on the screen are magnified to greater extent in one direction than in another and, more particularly, a projection system is provided wherein one image dimension, as the height, is increased while, preferably, the image width remains unaltered or substantially so.

For an illustration of one of the forms of my invention, there is shown in Fig. 1 of the accompanying drawing a projection system which comprises a suitable source of light 1, as the filament of an incandescent lamp which may have a suitable reflector 2 associated therewith. A suitable condensing lens system may be disposed to one side of the aforesaid source of light, said condensing lens system, as herein illustrated although not necessarily, comprising the spaced lenses 3 and 4. If desired, a suitable light-reflecting surface or mirror 5 may be disposed between the lenses 3 and 4 whereby the substantially horizontally extending light beam is deflected so as to pass substantially vertically.

Beyond the aforesaid condensing lens system, in the example illustrated in Fig. 1, the light beam emanating from the filament 1 coacts with any suitable representation-bearing surface or member T which may, for example, be a transparent or semi-transparent tape such as issues from "ticker" mechanism which prints on the tape characters giving such information as data concerning the price of stocks, said tape T, in the example shown, traveling flatwise in a direction at right angles to the plane of the sheet on which the drawing is made. After traversing the tape T, the light beam passes through any suitable projection or objective lens 6 and then continues toward the screen on which magnified images of the aforesaid characters are exhibited.

In accordance with my invention and as hereinbefore stated, a projection system such as illustrated, for example, in Fig. 1 includes or comprises a suitable device, structure or the like, such as a suitable mirror or cylindrical lens suitably associated therewith, for obtaining character images on the screen which are magnified to greater extent in one direction than in another. To this end and as illustrative of a preferred form of my invention, the projection system, beyond the projection lens 6 in the example shown, is illustrated as comprising a suitable light-reflecting surface or mirror 7 by which the light beam is reflected to a suitable screen 8.

In accordance with one form of my invention, the aforesaid mirror 7 presents a convex surface, as illustrated in Fig. 1, to the path of the light beam. Accordingly, it results that the images appearing on the screen 8 are magnified to a greater extent in a vertical direction than in a horizontal direction assuming that the projection system is positioned as shown in Fig. 1.

This point is well illustrated by reference to Figs. 1, 3 and 4. In Fig. 1, the broken lines represent a mirror 7a presenting a plane surface to the path of the light beam the same as is usual in this art and the broken lines to the left of said mirror 7a represent the limiting field rays of the light beam which projects on the screen 8 an image area of a height H$a$. With a curved mirror 7 arranged and constructed in accordance with my invention, an image area of a height H is projected on the screen 8 as represented by the full lines to the left of said mirror 7.

In Fig. 3, the face of the screen 8 is shown as it appears when the projection system includes a plane mirror 7a, the height H$a$, Fig. 3, of the image area being equal to the dimension H$a$, Fig. 1. In Fig. 4, the face of the screen 8 is shown as it appears when the projection system operates in accordance with my invention, the height H, Fig. 4, of the image area being equal to the dimension H.

Accordingly, as clearly appears from a comparison of Figs. 3 and 4, the utilization of a projection system in accordance with my invention results in a material and substantial increase in height of the projected images as compared to the height of the images when the projection system includes the prior art plane mirror 7a. Further, as will be observed from Figs. 3 and 4, the width of the images remains substantially the same in both cases.

From an analytical viewpoint, it appears that the curved mirror 7, in effect, constitutes an image-controlling agent provided in the system in addition to the objective lens 6 which, of course, forms the image proper. Where a plane mirror 7a is provided, its function is one solely of reflection; when the curved mirror 7 is substituted, the reflection feature remains and in addition, the mirror 7, because curved, has another function, namely, that of changing the character, specifically increasing the height of the image which would otherwise be produced by the objective lens 6.

Preferably, the mirror 7 is a cylindrical mirror in the sense that it is a segment of a hollow cylinder or substantially so and the cylinder elements are disposed parallel or substantially parallel to the screen 8. This condition exists in Fig. 1 were the screen 8 and mirror 7 are both shown as perpendicular to the plane of the paper on which the drawing is made. Therefore, as regards width, the images dimensionally are not changed since the mirror 7, in this respect, acts solely as a reflector, the image width being determined only by the objective lens 6.

If desired, the arrangement just described may be modified by suitably rotating the mirror 7, as through an angle of ninety degrees from the position shown in Fig. 1, so that the axis of the mirror cylinder, of which the mirror 7 is a part, together with the cylinder elements are inclined with respect to the plane of the screen 8. Under such circumstances, the width of the images is increased without substantial increase in image height.

For a reflecting system of any given type, it is obvious to one skilled in the art that the tape T should be positioned in the projection field in such manner that the images on the screen appear in upright position as shown in Fig. 4. In the example shown in Fig. 1, a single mirror 7a is positioned between the tape T and the screen 8. Accordingly and with such a mirror arrangement, if there is to be upright position of the images on the screen, the characters on the tape T should face downwardly, the top of said characters being nearer the right hand edge of the sheet on which the drawing is made and the bottom of said characters being nearer the left hand edge of said sheet, the characters being printed on the tape in the manner customary with the printing of ticker tape.

Where the projection is of the "news ticker" type, as illustrated in Fig. 5, it will be obvious to one skilled in the art that the printed tape is passed, depending upon the type of mirror system which is used, in the proper direction through the projection field in order to have the screen images appear in normal upright position.

My invention as described herein has been shown in connection with a system designed to project images of the characters on stock ticker tape. It is to be distinctly understood, however, that my invention is not to be so limited because the characters, representations, indicia or the like, images of which are to be obtained on the screen may be formed on or borne by any suitable surface, member or the like, the latter being manually movable into projection position, if desired, or automatically in any suitable manner or the same or somewhat the same as with the herein described tape T.

As described in connection with Fig. 1, the projection is of the "through" character or of that type wherein the light beam passes through the member bearing the representations, images of which are to be obtained on the screen 8. As well, the projection may be of the type known as "opaque" or "reflecting" wherein the light beam is reflected by a non-transparent member bearing the image-producing characters or representations.

With either through or opaque projection, one important application of my invention relates to a system including a printer device or news "ticker" such, for example, as is known to the art as the Dow-Jones type which comprises mechanism for printing news items or the like line-by-line on a web of paper which is moved step-by-step into projecting position whereby images of a plurality of lines of such printed matter appear on the screen.

In the copending application of E. H. Unkles, Serial No. 325,551, filed December 12, 1928, there is illustrated an opaque projecting arrangement of the character to which reference was made immediately above. The screen and the image-showing thereon disclosed in Fig. 1 of said Unkles application is herewith reproduced as Fig. 5 of this application, the screen being herein designated at 10 and the frame therefor at 11. As shown in Fig. 2 of said Unkles application, reflection of the light beam is obtained by plane mirrors whereby the images on the screen have a certain height and this is disclosed herein by Fig. 5. In accordance with my invention, a curved mirror such as the herein disclosed mirror 7 may be substituted for the Unkles plane mirror 85 in which case substantial increase is effected in the height of the images on the screen 10.

This increase in image height is accompanied by an increase in the distance between adjacent lines of images on the screen 10 so that increase of the screen height is required if the number of image lines visible thereon is to remain the same as in Fig. 5. However, by suitably adjusting the printer mechanism, the distance between adjacent lines as printed on the web of paper may be decreased substantially as compared with prior practice and as a result the height of screen 10 need not be increased to obtain a desired number of lines of images thereon even though the height of each image has been increased substantially compared with the prior art practice.

As hereinbefore stated, ordinarily, the width of the images on the screen remains substantially unchanged even though there has been a marked increase in the height of said images. Usually, therefore, when the projection system operates in accordance with my invention, it results that the width of the screen need not be increased beyond prior practice.

Therefore, as regards that application of my invention where the novel projection system is associated with such a device as a Dow-Jones printer or news "ticker," it becomes apparent that the character images are of greater height than occurs in the prior art. Despite this, it has been shown that it is not necessary, ordinarily, to increase the screen width and, further, by decreasing the spacing of the lines as printed, the desired or required number of image lines may be produced on said screen. Accordingly, when practicing my invention, the screen dimensions may be as small as those of the prior art which is desirable. At the same time, the increased image height obtained by my invention is highly conducive to more ready and easier observation of the information reproduced on the screen.

With all applications of my invention, the increase in image height is highly important for the reasons noted immediately above and for the further reason that office space may be saved because the screen dimensions may be those of prior practice, if desired, while still obtaining great increase in one image dimension. Moreover, as has been stated, it is highly desirable that the screen width be kept at a minimum and, with all forms of my invention, the screen width may be that of the prior art if desired even though the images on the screen are of substantially greater height than exists in the prior art for the same screen width.

Another important feature of my invention, particularly as regards that application thereof wherein the member T is a tape issuing from stock ticker mechanism at relatively high speeds, resides in the particular manner or character of image enlargement. When the tape T issues from the "ticker" mechanism at relatively high speed, the rate of image movement across the screen occurs at a similar high speed. Where the images are increased only in height in accordance with my invention, it results that such images may be more readily read or observed than under prior art conditions or even if they were enlarged to a desired degree in accordance with prior art practice by correspondingly increasing the image width as the image height is increased. This follows because a rapidly moving elongated or tall object without great width may be more readily observed and its movement better followed than is the case when such object has substantial width in addition to height; the lack of width of the image, in accordance with my invention, serves to accentuate or make marked the increased height whereby it is more readily observable.

From the foregoing, it becomes evident that my invention involves an arrangement for producing on a screen a character image having dimensions of a given ratio and differing from the ratio of the corresponding dimensions of the character producing such image.

Thus, for example, if the ratio of the height to the length of the character is related as 2:1, the ratio of the height to the length of the image of such character may be as 2.5:1, 3:1, or otherwise as may be desired. With prior art projecting systems, if the ratio of height to length of the character is as 2:1, then the resulting height-to-length ratio of the character image is the same, or substantially so.

Where a mirror is utilized in accordance with my invention, it is desirable that it be so positioned that the light beam passes to the screen therefrom without further reflection. However, under some circumstances, this arrangement may be different as desired. The mirror may be of any suitable character consonant with the conditions hereinbefore described. Preferably, it is curved symmetrically and, if desired although not necessarily, it may be a second-surface reflector, i. e., a reflector wherein the light beam passes in both directions through the glass toward and from the reflecting surface.

It shall be understood that the surface with which the light beam coacts to produce images on the screen may have printed or otherwise formed thereon or may bear any suitable representations, indicia, letters, figures, characters or the like and that the information may appear either in single or plural lines. In the appended claim, for the sake of brevity, the term "character" or "characters" is used as generically describing such representations, indicia, letters, etc. and it shall be understood that the meaning of these terms shall be in accordance with this definition.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claim to cover all such changes and modifications.

What is claimed as new and desired to be secured by Letters Patent is:

In a system for projecting images from a web-like surface having characters printed thereon in line form, a vertical screen, a source of light, means for condensing light from said source into a light beam for passage to said screen, said web-like surface being movable transversely of the path of said light beam, an objective lens in said path for forming images of said characters on said screen, and means for increasing the height of said images without substantial increase in the width thereof, said means comprising a cylindrical mirror between said objective lens and said screen for reflecting said light beam substantially horizontally to said screen, said mirror presenting its convex surface to said light beam and having its elements disposed substantially parallel to said screen.

In testimony whereof I have signed my name to this specification.

DAVID F. NEWMAN.